(12) United States Patent
Hori

(10) Patent No.: US 7,489,598 B2
(45) Date of Patent: Feb. 10, 2009

(54) OPTICAL DISC REPRODUCING APPARATUS

(75) Inventor: Masayuki Hori, Fukushima (JP)

(73) Assignee: D&M Holdings Inc., Kawasaki-shi, Kanagawa (JP)

( * ) Notice: Subject to any disclaimer, the term of this patent is extended or adjusted under 35 U.S.C. 154(b) by 805 days.

(21) Appl. No.: 10/799,699

(22) Filed: Mar. 15, 2004

(65) Prior Publication Data

US 2005/0068857 A1 Mar. 31, 2005

(30) Foreign Application Priority Data

Sep. 30, 2003 (JP) ............................. 2003-340243

(51) Int. Cl.
*G11B 7/085* (2006.01)

(52) U.S. Cl. ................. 369/30.27; 369/53.3; 369/53.43; 369/52.1; 369/47.36

(58) Field of Classification Search ................. 369/53.3
See application file for complete search history.

(56) References Cited

U.S. PATENT DOCUMENTS 6,541,690 B1 4/2003 Segers, Jr.
6,590,840 B2 7/2003 Inoue
6,898,165 B2 * 5/2005 Kikuchi ...................... 369/53.3
7,010,371 B2 * 3/2006 Liu .............................. 700/94
2003/0165100 A1 9/2003 Kikuchi

FOREIGN PATENT DOCUMENTS

JP 2001-312857 11/2001
WO WO-97/01168 1/1997

* cited by examiner

*Primary Examiner*—Tan X Dinh
*Assistant Examiner*—Kezhen Shen
(74) *Attorney, Agent, or Firm*—Dickstein Shapiro LLP

(57) ABSTRACT

According to the invention, an optical disc reproducing apparatus includes a housing for: a reading section which reads data recorded on an optical disc, a data storing section and a reproducing section which reproduces the stored data. A reference discal unit outside the housing rotates at a pre-determined reference rotational speed and direction. An operation discal unit mounted on the reference discal unit, may rotate at a desired speed and direction. A detection discal unit is coupled with the operation discal unit, to rotate in sync with the operation discal unit. First and second detecting sections detect a rotational speed and direction of the detection discal unit and the reference discal unit, respectively. A control section determines the rotational speed and direction of the detection discal unit based on detected results and controls the reading section, the storing section and the reproducing section, thereby performing a desired data reproduction.

3 Claims, 3 Drawing Sheets

OPTICAL DISC REPRODUCING APPARATUS

BACKGROUND

The present invention relates to an optical disc reproducing apparatus which stores in a memory, audio data reproduced from an optical disc, and changes a speed and sequence for reading out the audio data stored in the memory, by manipulating an operation discal unit.

An operator, called "DJ (Disc Jockey)" who manipulates an audio reproducing apparatus to reproduce audio data, may often perform, so-called "scratch reproduction", in the process of reproducing the audio data recorded on an optical disc, such as analogue record or Compact Disc (hereinafter referred to as "CD"). The scratch reproduction is a specialized reproducing technique which generates an effective sound like a scratch sound. When the DJ performs the scratch reproduction by use of the analogue record, this kind of scratch sound is generated by turning the analogue record rapidly in forward direction or in reverse direction. There is also a CD player specifically targeted for a DJ, which is capable of performing a special reproduction similar to the scratch reproduction generated by the analogue record (for example, see the Unexamined Japanese Patent Laid-open KOKAI Publication No. 2001-312857).

This type of CD player includes a jog dial and a memory. Audio data reproduced from a CD is stored in the memory, and the jog dial is rotated in forward direction or in reverse direction, whereby the speed and sequence for reading out the audio data stored in the memory is controlled so that an effective sound similar to the scratch sound which is generated with an analogue record can be produced. As thus described, the DJ conducts a turning manipulation on the jog dial, in the process of reproducing the audio data recorded on the CD, as in the case of using an analogue record, thereby achieving a special reproduction such as the scratch reproduction, which is similar to the one generated with the analogue record.

In a type of CD player targeted for a DJ as described above, the audio data recorded on the CD is reproduced at a normal speed (hereinafter, referred to as "normal reproduction"), if the jog dial is not manipulated. When the jog dial is manipulated for rotating, the CD player detects its rotational speed and rotational direction. According to the rotational speed and rotational direction thus detected, a special reproduction is made for changing the speed and sequence for reading out the audio data reproduced from the CD and stored in the memory.

In the CD player targeted for the DJ as described above, detecting the rotational speed and the rotational direction of the jog dial (or turntable) is performed using an optical technique. For example, the detection is performed by an optical means such as an optical sensor, which senses the rotation of the jog dial itself, or the rotation of a member such as a basic disk which rotates in synchronization with the jog dial (for example, see the International Patent Application No. WO97/01168).

SUMMARY

In such a device as described above, there is a case that the optical sensor is mounted in such a manner as being exposed to outside. However, in general, the CD player targeted for a DJ is used under circumstances such as a disco, so-called "club", full of smoke and very dusty. Under such circumstances, dust may adhere to detecting members, such as a rotary member and a sensor, and the optical system may become instable. Therefore, a detection of the rotation and a reproduction operation based thereon may become inaccurate, and what is worse, such functions may fail to operate.

Furthermore, the CD player targeted for a DJ is required to handle a strenuous manipulation, such as a scratch reproduction as described above. Therefore, a structure with a detecting member such as a sensor, projecting outwardly, may reduce durability, as well as interfering with the DJ's action.

As thus described, there has been a demand for an optical disc reproducing apparatus such as a CD player, which is capable of operating accurately even in circumstances dusty and the like, with high durability to withstand the strenuous manipulation and good operability for a user (in particular, for a DJ).

In view of the above situations, the present invention helps to provide an optical disc reproducing apparatus which is capable of operating with high reliability and durability even under any difficult circumstances, and is capable of performing a special reproduction as in the case with an analogue record.

The present invention further helps to provide an optical disc reproducing apparatus, which is good in operability for a user (in particular for a DJ), and is capable of performing a special reproduction as in the case with an analogue record.

In order to achieve the above objectives the optical disc reproducing apparatus relating to the first mode of the present invention includes, a housing, a reading section for reading data recorded on an optical disc, a storing section which stores data read by said reading section, a reproducing section which can reproduce data stored in said storing section, a reference discal unit which is disposed outside said housing and which is rotatable at a predetermined reference rotational speed and in a predetermined reference rotational direction, an operation discal unit which is mounted on said reference discal unit to rotate together with said reference discal unit, and which is capable of rotating in a desired rotational direction at a desired rotational speed according to a user's manipulation, a detection discal unit which is accommodated in said housing, and which is connected with said operation discal unit to rotate in sync with the rotation of said operation discal unit, a first detecting section which is disposed inside said housing, and which can detect a rotational speed and rotational direction of said detection discal unit, a second detecting section which is disposed outside said housing, and which can detect a rotational speed and rotational direction of said reference discal unit, and a control section which can determine the rotational speed and rotational direction of said detection discal unit based on each detected result from said first detecting section and said second detecting section, and which can control said reading section, said storing section and said reproducing section, so that a data reproduction desired by the user can be performed, wherein said reading section is disposed in said housing, wherein said reference discal unit is rotatably mounted on a cylindrical member fixed to said housing, and wherein said operation discal unit is connected to said detection discal unit by a shaft at least partly located inside said fixed cylindrical member.

In the first mode of the present invention, the control section may give a control to read the data stored in the storing section at a reference reading speed and in a reference reading sequence, which are predetermined, when it is determined that the detection discal unit is rotating at the reference rotational speed and in the reference rotational direction. On the other hand, the control section may give a control to read the data stored in the storing section at the reading speed and in the reading sequence according to a detected result from the first detecting section, when it is determined that the detection discal unit is not rotating at the reference rotational speed in the reference rotational direction. Furthermore, in the first mode of the present invention, the reference discal unit has a cross-section of concave shape, and with this concave shaped portion of the reference discal unit, the second detecting section may be protected from outside.

In order to achieve the above objective, an operating apparatus for optical disc reproduction according to a second mode of the present invention includes, a housing, a discal unit which is disposed outside the housing and is rotated t a rorational speed and in a rotational direction, which are predermined, an operational discal unit which is mounted on the discal unit, rotating together with the discal unit, and is capable of rotating in a desired rotational direction at a desired rotational speed according to the user's manipulation, detection discal unit which is accommodated in the housing, and is coupled with the operation discal unit, in such a manner as rotating in sync with the rotation of the operation discal unit, a first detecting section which is disposed outside the housing, and detects the rotational speed and rotational direction of the detectional discal unit, a second detecting section which is disposed inside the housing, and detects the rotaional speed and rotational direction of the detection discal unit, and a control section which controls a processing of data recorded on an optical disc on an optical disc reproducing apparatus being connected externally, according to each detected result of the first detecting section and the second detecting section, so that data reproduction desired by a user is performed.

According to the present invention, it is possible to provide an optical disc reproducing apparatus which is capable of operating with high reliability and durability even under any difficult circumstances, and is capable of performing a special reproduction as in the case with an analogue record. In particular, according to the present invention, it is possible to provide an optical disc reproducing apparatus which prevents a failure in detecting the rotational speed and the rotational direction of the operation discal unit, due to dusts floating around the optical disc reproducing apparatus, which adhere to the first optical sensor section for detecting the rotation of the operation discal unit.

DESCRIPTION OF THE PREFERRED EMBODIMENTS

Preferred embodiments of the present invention will be explained with reference to the attached drawings.

Figure 1:
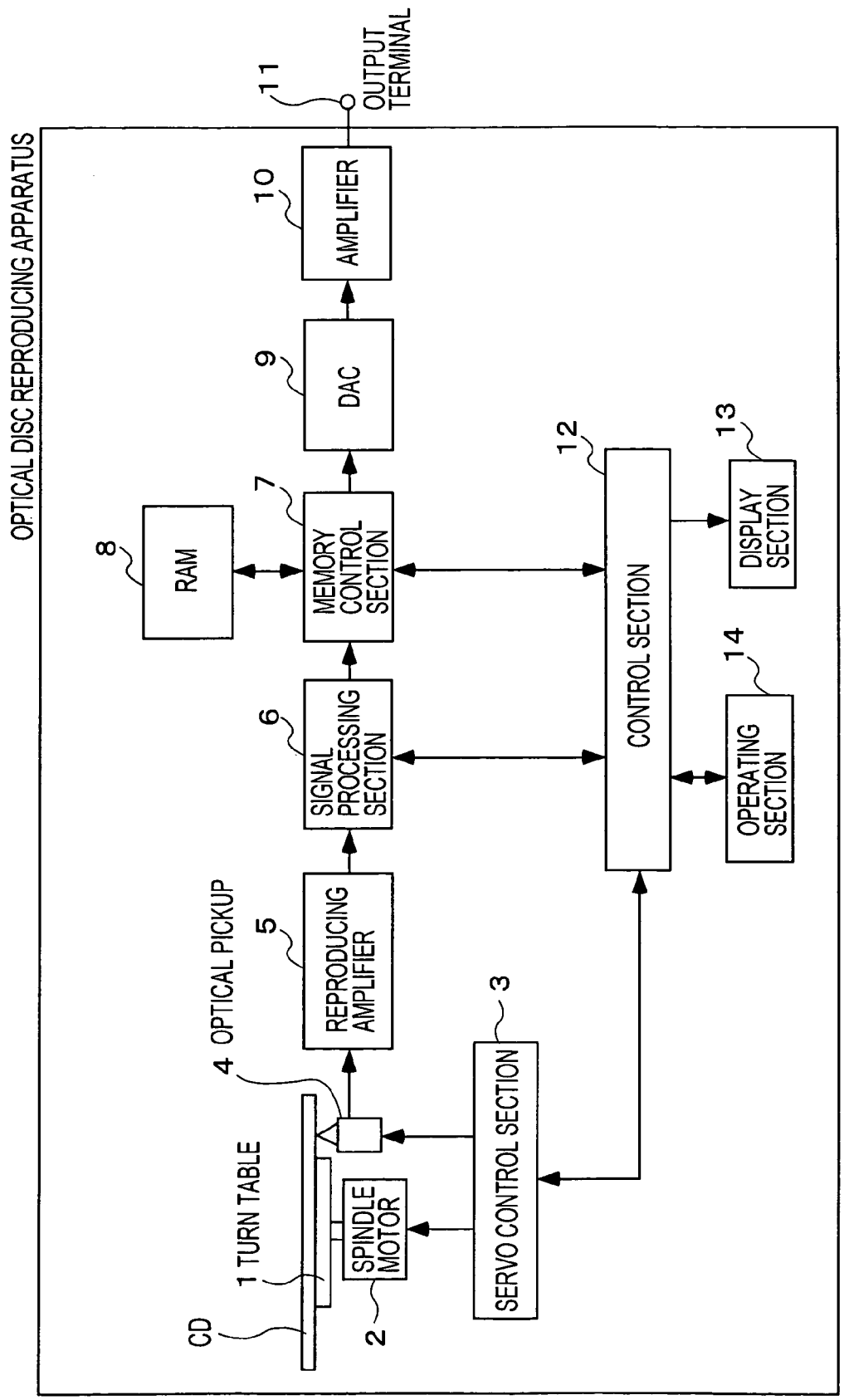
FIG. 1 is a block diagram showing a configuration of the optical disc reproducing apparatus to which an embodiment of the present invention has been applied.

FIG. 1 is a block diagram showing a configuration of the optical disc reproducing apparatus, which is one embodiment of the present invention. In FIG. 1, reference numeral 1 indicates a turn table, numeral 2 indicates a spindle motor, numeral 3 indicates a servo control section, numeral 4 indicates an optical pickup, numeral 5 indicates a reproducing amplifier, numeral 6 indicates a signal processing section, numeral 7 indicates a memory control section, numeral 8 indicates RAM (Random Access Memory), numeral 9 indicates DAC (Digital to Analog Converter), numeral 10 indicates an amplifier, numeral 11 indicates an output terminal, numeral 12 indicates a control section, numeral 13 indicates a display section, and numeral 14 indicates an operating section. The optical disc reproducing apparatus of the present embodiment is targeted particularly for a DJ, including a jog dial portion, which is a read instructing portion in the operating section 14. According to a rotational speed and a rotational direction of the jog dial portion, reading speed and reading sequence of digital audio data reproduced from a CD and stored in RAM 8 can be changed. The optical disc reproducing apparatus is structured such that the reproducing/reading section from the CD and the jog dial portion are integrally accommodated in one housing, though it is not illustrated.

The turn table 1 fixed on the spindle motor 2 stabilizes the CD. When an instruction to start reproducing is inputted from the operating section 14, the servo control section 3 gives a control to rotationally drive the spindle motor 2 at a predetermined linear velocity. The servo control section 3 controls a focus servo circuit and a tracking servo circuit, which are not illustrated, to allow a laser beam from the optical pickup 4 to accurately trace pit lines on the CD.

The digital audio data reproduced by the optical pickup 4 is subjected to waveform shaping and is amplified by the reproducing amplifier 5, and is inputted in the signal processing section 6. The signal processing section 6 demodulates the digital audio data, extracts an error signal such as a focus error signal and a tracking error signal, and a synchronizing signal, and the like. Then, the digital audio data is inputted to the memory control section 7.

The memory control section 7 gives a control to input into the RAM 8 thus inputted digital audio data. The RAM 8 stores thus inputted digital audio data. The digital audio data stored in the RAM 8 is read out and inputted to the DAC 9, under the control by the memory control section 7.

The DAC 9 converts the digital audio data into an analog audio signal, and inputs the converted signal to the amplifier 10. The analogue audio signal inputted from the DAC 9 is amplified by the amplifier 10, and is outputted from a speaker and the like connected to the output terminal 11.

The display section 13 displays a reproducing time, a track number and the like regarding the track currently under reproduction. The operating section 14 includes the jog dial portion, a reproducing start button, and a reproducing stop button, an eject button and the like.

Figure 2:
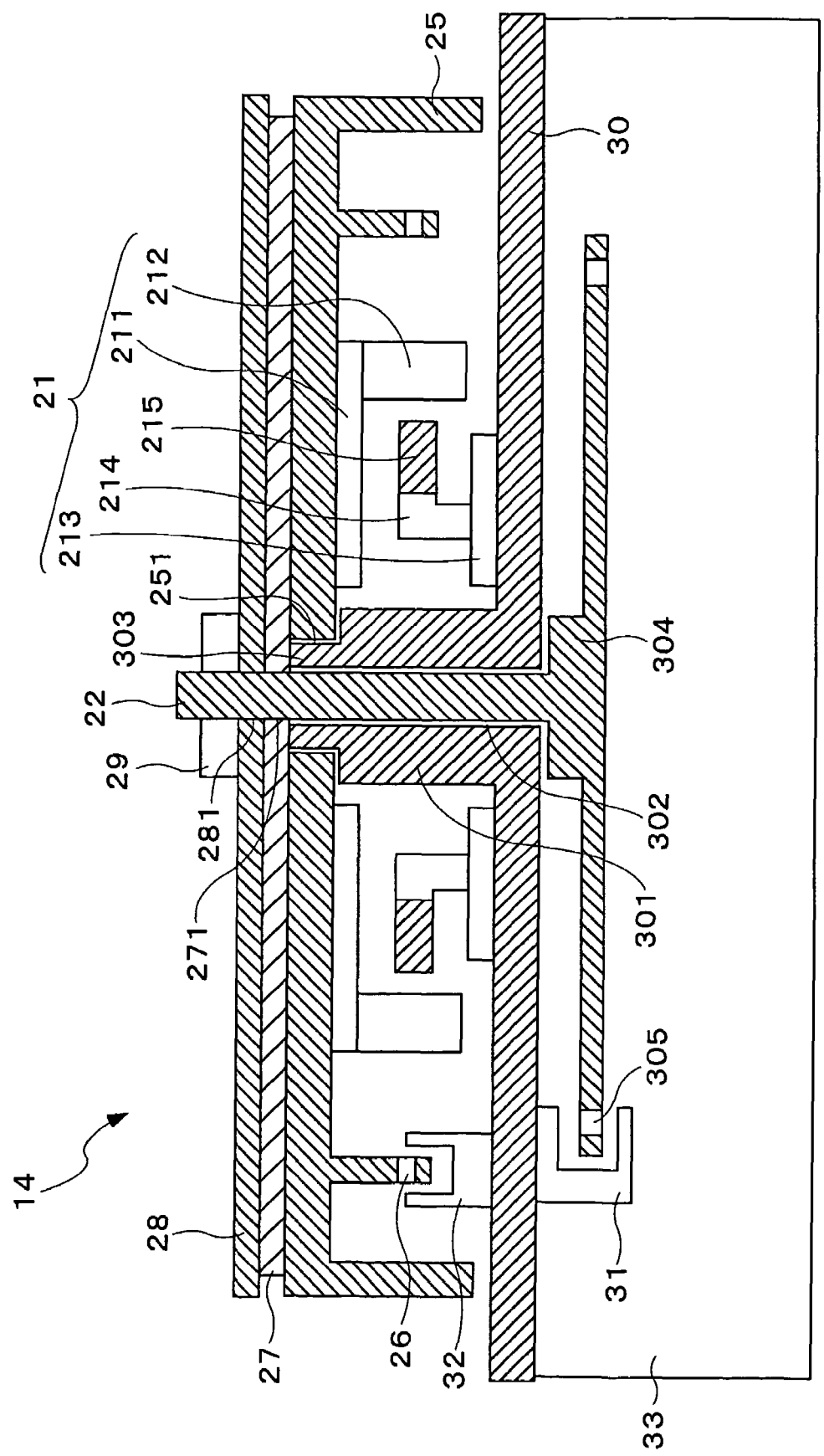
FIG. 2 is a diagram showing a cross section of a jog dial portion of the optical disc reproducing apparatus to which an embodiment of the present invention has been applied.

FIG. 2 is a diagram showing a cross section of the jog dial portion provided in the operating section 14 of the optical disc reproducing apparatus, which is one embodiment of the invention. In FIG. 2, reference numeral 21 indicates a motor section, numeral 22 indicates a shaft, numeral 25 indicates an discal unit, numeral 27 indicates a sheet section, numeral 28 indicates an operation discal unit, numeral 29 indicates a stopper section, numeral 30 indicates a panel, numeral 31 indicates a first optical sensor section, numeral 32 indicates a second optical sensor section, and numeral 33 indicates a housing.

The configuration of the jog dial portion as shown in FIG. 2 will be explained.

The housing 33 forms a box shape, and a panel 30 is fixed onto a top surface thereof. Inside the housing 33, other elements such as aforementioned turn table 1 are accommodated, though they are not illustrated. The panel 30 is provided with a cylindrical section 301 having a cylindrical shape and projecting upwardly. The upper portion of the cylindrical section 301 is provided with a convex portion 303, projecting upwardly. Roughly in the center of the cylindrical section 301, there is provided a hole 302 penetrating vertically.

The discal unit 25 includes a hole 251 penetrating vertically roughly in the center. By inserting the convex portion 303 into the hole 251, the discal unit 25 rotates freely about the cylindrical section 301. A slit section 26 is provided on the backside of the discal unit 25. The slit section 26 is made of, for example, same material as that of the discal unit 25, and has a ring-like plate on which rectangle-shaped openings are provided at even intervals. The discal unit 25 has a strip-like portion provided on the rim thereof nearly perpendicular to the master surface, thereby forming a concave shape as a whole. The discal unit 25 is arranged so that the concave portion faces the panel 30.

The motor section 21 includes a substrate 211, a magnet 212, a substrate 213, a holding section 214 and a coil 215. The substrate 213 is fixed on the top surface of the panel 30. On the top surface of the substrate 213, a plurality of coils 215 are fixed via the holding section 214. Each of the coils 215 are arranged at even intervals having the cylindrical section 301 as a center. The substrate 211 is fixed on the under surface of the discal unit 25. On the under surface of the substrate 211, there are provided a plurality of magnets 212. Each of the magnets 212 is arranged in the circumference of the coils 215 at even intervals. The coils 215 are connected to a motor driving circuit by a conductive cable, not illustrated, via the substrate 213 and the holding section 214. The motor drive circuit supplies power to the coils 215, under a control by the control section 12. The coils 215 become electromagnets bearing magnetic forces of the S (South) pole and the N (North) pole, when a power is supplied from the motor drive circuit. Since the coils 215 bear the magnetic forces of the S pole and the N pole caused by the power from the motor drive circuit, the magnets 212 are attracted towards the coils 215, and rotated about the cylindrical section 301.

With the configuration as described above, the motor section 21 allows the discal unit 25 to rotate, under the control of the control section 12.

The shaft 22 is inserted into the hole 302. At the bottom of the shaft 22, a rotation discal unit 304 is fixed, which has a shape of disc. On the outer peripheral portion of the rotation discal unit 304, a slit section 305 having rectangle-shaped openings at even intervals is provided. The sheet section 27 is provided with a hole 271 at the center thereof, and the sheet section 27 is mounted on the top surface of the discal unit 25 in a state that the shaft 22 is inserted into the hole 271. Here, for the sheet section 27, a member having the following feature is employed. That is, the member has a frictional coefficient, for example, to the extent that the operation discal unit 28 currently stopped is allowed to start rotating after a lapse of 0.1 to 0.2 seconds, following the rotational speed of the discal unit 25 currently rotating. Furthermore, it is preferable that the operation discal unit 28 has a large area, and the material and the thickness thereof are adjusted so that it can follow the driving torque propagated from the motor 21, in order to make the self weight and the inertial moment smaller. Accordingly, even in the case where the frictional coefficient of the sheet section 27 is small on which the operation discal unit is mounted, the operation discal unit 28 can restart the rotation at a predetermined speed, when a hand is moved off the operation discal unit 28.

The operation discal unit 28 includes a hole 281 at the center thereof. The operation discal unit 28 is mounted on the top surface of the sheet section 27. The operation discal unit 28 is fixed to the shaft 22 in a state that the shaft 22 is inserted into the hole 281. The stopper section 29 is fixed on the upper portion of the shaft 22, so that the shaft 22 does not fall from the operation discal unit 28, the sheet section 27 and the hole 302.

By manipulating the operation discal unit 28, it rotates about the shaft 22, while sliding on the top surface of the sheet section 27. When the operation discal unit 28 rotates, the shaft 22 and the rotation discal unit 304 also rotate in sync with the rotation of the operation discal unit 28.

The first optical sensor section 31 is configured by two optical sensors for detecting the rotational direction and the rotational speed (rotation status) of the operation discal unit 28, and is fixed on the under surface of the panel 30 so as to detect the openings of the slit section 305. Therefore, the first optical sensor section 31 is accommodated inside the housing 33, and is disposed in such a manner as not being exposed to outside. Similarly, the second optical sensor part 32 is configured by two optical sensors for detecting the rotational direction and the rotational speed (rotation status) of the discal unit 25, and is fixed on the top surface of the panel 30 so as to detect the openings of the slit section 26. The second optical sensor section 32 is disposed inside the concave portion of the discal unit 25, and it is configured in such a manner as not directly exposed to outside.

Generally, the CD player targeted for a DJ is used in a place with plenty of dust and the like, but in the embodiment of the present invention, the first and the second optical sensor sections 31, 32 are disposed so that they are not directly exposed to outside. Therefore, as described in the following, it is possible to avoid a malfunction due to adhesion of dust onto lens, disc and the like, thereby enhancing the reliability. Furthermore, the first and the second optical sensors 31, 32 are not projected outwardly from the surface of the housing 33, thereby enhancing the operability for a user, and further enhancing the durability against a strenuous manipulation.

Here, a method for detecting the rotation status by the optical sensor section will be explained. In the following, a case where a rotation status of the operation discal unit 28 is detected will be explained as a way of example.

Here, it is assumed that the two optical sensors of the first optical sensor section 31 are "sensor A" and "sensor B". Each of the sensor A and the sensor B outputs a pulse signal indicating "OFF", when they detect the opening of the slit section 305. On the other hand, when they detect a closing portion of the slit 305, each outputs a signal indicating "ON".

The sensor A and the senor B are arranged so that the following four output patterns are generated as a combination of the pulse signals outputted from the two sensors.

Pattern 1: (sensor A) ON—(sensor B) ON
Pattern 2: (sensor A) ON—(sensor B) OFF
Pattern 3: (sensor A) OFF—(sensor B) ON
Pattern 4: (sensor A) OFF—(sensor B) OFF The first optical sensor section 31 detects an opening of the slit section 305, generates a first pulse signal according to the rotation status of the rotation discal unit 304, and then, inputs the first pulse signal to the control section 12. On the other hand, the second optical sensor section 32 detects an opening of the slit section 26 of the discal unit 25, generates a second pulse signal according to the rotation status of the disc section 205, and then, inputs the second pulse signal to the control section 12.

Here, the rotational speed of the operation discal unit 28 is calculated in the control section 12, according to the number of pulses outputted within a predetermined period of time. The rotational direction is determined in the control section 12, according to the generation sequence of the output patterns, regarding the pulse signals from the sensor A and the sensor B, which vary in accordance with the rotational direction of the operation discal unit 28.

Specifically, when the operation discal unit 28 rotates in clockwise, for example, the output pattern is generated in the sequence; pattern 4→ pattern 2→ pattern 1→ pattern 3→ pattern 4→ pattern 2 . . .

On the other hand, when the operation discal unit 28 rotates in anticlockwise, the output pattern is generated in the sequence; pattern 2→ pattern 4→ pattern 3→ pattern 1→ pattern 2→ pattern 4 . . .

As thus described, the control section detects a difference in the generation sequence of the above mentioned output patterns, and determines the rotational direction of the operation discal unit 28. A method for detecting the rotational status of the discal unit 25 by the second optical sensor section 32 is similar to the above described detection method, and thus explanation thereof will be omitted.

The control section 12 determines the rotational status of the operation discal unit 28 in accordance with the first pulse signal inputted from the first optical sensor section 31. Then, according to the rotational speed and the rotational direction thus determined, the control section 12 controls the memory control section 7 to read the digital audio data stored in the RAM 8. Furthermore, the control section 12 monitors the second pulse signal inputted from the second optical sensor section 32, and controls the motor 21 to maintain the rotational speed of the discal unit 25 at a predetermined speed.

When the optical disc reproducing apparatus of the present embodiment reproduces the audio data recorded on a CD, the motor 21 rotates at a predetermined speed (for example, at an angular velocity of a turn table in a case of reproduction on an analog record player). When the discal unit 25 rotates at the predetermined speed by means of the motor section 21, the sheet section 27 and the operation discal unit 28 rotate at the same speed. At this timing, the rotation discal unit 304 also rotates at the same speed as that of the operation discal unit 28. The rotational direction of the motor section 21 is same as the rotational direction of the turn table of the analogue record player (in clockwise direction) Therefore, with the optical disc reproducing apparatus of the present embodiment, it is possible to conduct a similar manipulation as that of the special reproduction employing an analogue record.

In the optical disc reproducing apparatus of the present embodiment, the aforementioned predetermined speed may be set same as a speed of the turntable at the time of reproduction on the analogue record player, and the rotational direction may be set same as the rotational direction of the turn table of the analogue record player. Here, the stopper section 29, the discal unit 25, the sheet section 27 and the operation discal unit 28 rotate at the same speed and in the same direction as those of the motor 21. Consequently, the operation discal unit 28 provides a similar action as that of an analogue record, when the audio data recorded on a CD is reproduced in the optical disc reproducing apparatus of the present embodiment.

It is to be noted that, in a normal operation, for example, when an operator provides an action such as putting his or her hand on the operation discal unit 28, the discal unit 25 maintains rotating at a predetermined speed without influenced by such an action onto the operation discal unit 28, since the frictional coefficient of the sheet section 27 is small However, if the force applied onto the operation discal unit 28 becomes larger, the frictional coefficient becomes larger accordingly, resulting that the action onto the operation discal unit 28 may effect on the discal unit 25. Even in such a case, according to the feedback control of the control section 12, the discal unit 25 is kept rotating at a constant speed.

Firstly, a reproducing operation of the optical disc reproducing apparatus of the present embodiment will be explained, in a case where the operation discal unit 28 is stopped, which is rotating at a predetermined speed.

At first, the DJ puts his or her hand on the operation discal unit 28 rotating at a predetermined speed, so as to make the rotational speed gradually slower. At this timing, since the frictional coefficient of the sheet section 27 is small, the discal unit 25 rotates at a predetermined speed without influenced by the rotational speed of the operation discal unit 28. When the rotational speed of the operation discal unit 28 is changed, the rotational speed of the rotation discal unit 304 also changed, and then, the number of pulses of the first pulse signal generated from the first optical sensor section 31 within a constant period of time is changed in accordance with the rotational speed of the rotation discal unit 304. The control section 12 determines the rotational speed of the operation discal unit 28, by way of the rotational speed of the rotation discal unit 304, based on the number of pulses of the first pulse signal inputted from the first optical sensor section 31 within a constant period of time. The control section 12 controls the memory control section 7 in accordance with the rotational speed thus determined. The memory section 7 gives a control to make the speed for reading out the digital audio data from the RAM 8 slower.

When the rotation of the operation disc section 28 is stopped, the rotation discal unit 304 also stops, and the first optical sensor 31 does not input the first pulse signal to the control section 12. If there is no input of the first pulse signal from the first optical sensor section 31, for a predetermined period of time or more, the control section 12 controls the memory control section 7 to stop reading the digital audio data from the RAM 8.

When the DJ moves his or her hand off the operation discal unit 28 and the manipulation is completed, since the discal unit 25 rotates at a predetermined speed, the operation discal unit 28 restarts the rotation. The rotation discal unit 304 also restarts the rotation at the predetermined speed similar to the predetermined rotation speed of the discal unit 25. When the operation discal unit 28 restarts the rotation and the rotation discal unit 304 rotates at a predetermined speed, the control section 12 controls the memory control section 7 to read out the digital audio data from the RAM 8 at a reading speed for a normal reproduction.

In the case where the DJ rotates by hand, the operation discal unit 28 which is now rotating at a predetermined speed, at a faster speed than the predetermined speed, so as to gradually increase the rotational speed of the operation discal unit 28, the control section 12 controls the memory control section 7 to render the speed for reading the digital audio data from the RAM 8 faster, in accordance with the number of pulses of the first pulse signal inputted from the first optical sensor section 31 within a constant period of time.

Next, a reproducing operation of the CD player as one embodiment of the present invention will be explained, in the case where the operation discal unit 28 is rotated in reverse direction, from the direction in which the operation discal unit 28 is rotating at a predetermined speed.

The DJ rotates by hand in a reverse direction (in anticlockwise direction) the operation discal unit 28 which is rotating at a predetermined speed. At this timing, since the frictional coefficient of the sheet section 27 is small, the discal unit 25 can rotate at a predetermined speed without influenced by the rotational speed and the rotational direction of the operation discal unit 28. The first optical sensor section 31 is provided with two optical sensors and when the rotational direction of the operation discal unit 28 is changed, the rotational direction of the rotation discal unit 304 is also changed in the same way. Therefore, the output pattern of the pulse signals generated from the two optical sensors is changed according to the rotational direction of the operation discal unit 28. The control section 12 determines the rotational direction of the operation discal unit 28 based on the output pattern of the first pulse signals inputted from the two optical sensors. Furthermore, as described above, the control section 12 determines the rotational speed of the operation discal unit 28 based on the number of pulses of the first pulse signal inputted from the first optical sensor 31 within a constant period of time. The control section 12 controls the memory control section 7 in accordance with the rotational speed and the rotational direction thus determined. The memory control section 7 controls the speed and the sequence for reading the digital audio data from the RAM 8.

When the DJ moves his or her hand off the operation discal unit 28 and the manipulation is completed, the operation discal unit 28 restarts the rotation at the predetermined speed and in a predetermined direction, since the discal unit 25 rotates at a predetermined speed. When the operation discal unit 28 restarts the rotation at a predetermined speed and in the predetermined direction, the rotation discal unit 304 also rotates at the predetermined speed and in the predetermined rotational direction, and the control section 12 controls the memory control section 7 to read out the digital audio data from the RAM 8 at a reading speed in normal reproduction.

In the above described embodiment, if the rotational speed of the discal unit 25 rotating at a predetermined speed is changed while the operation discal unit 28 is manipulated, the control section 12 controls the motor section 21 so that the rotational speed of the discal unit 25 can keep a predetermined speed, in accordance with the number of pulses of the second pulse signal inputted from the second optical sensor section 32 within a constant period of time.

In the case where the scratch reproduction is performed by use of the optical disc reproducing apparatus of the present embodiment, the DJ repeats a manipulation to rotate by hand the operation discal unit 28 rapidly in forward direction or in reverse direction. The control section 12 determines the rotational speed and the rotational direction of the operation discal unit 28 by way of the rotation discal unit 304 based on the first pulse signal inputted from the first optical sensor section 31. The control section 12 controls the memory control section 7 in accordance with thus determined rotational speed and the rotational direction. The memory control section 7 controls the speed and the sequence (reading the audio data in ascending address order or in descending address order) for reading the digital audio data stored in the RAM 8. The, digital audio data read out from the RAM 8 is converted to analogue audio signals by the DAC 9, and the converted signals are amplified by the amplifier 10. Then, an effective sound such as scratch sound is outputted from a speaker connected to the output terminal 11.

With the configuration above, according to the optical disc reproducing apparatus of the present embodiment, a special reproduction such as scratch reproduction can be performed, by a rotational manipulation on the operation discal unit 28, so as to change a state where the discal unit 25 and the operation discal unit 28 are rotating at the same predetermined speed.

Since the optical disc reproducing apparatus of the present invention is configured such that the rotation discal unit 304, which rotates along with the operation discal unit 28, is disposed inside the housing 33, the slit section 305 and the first optical sensor section 31 are not exposed to outside from the surface of the panel 30. Accordingly, when a user, in particular a DJ, manipulates the operation discal unit 28, there is no possibility of danger that the first optical sensor section 31 may interfere with the user's manipulation or it may be destroyed, due to a contact of the user's hand with the first optical sensor section 31. Therefore, a good operability and a high durability can be achieved. Since the first optical sensor section 31 and the rotation discal unit 304 are configured such that they are disposed inside the housing 33, dusts floating around the optical disc reproducing apparatus hardly adhere to the slit section 305. Therefore, it is possible to prevent a case that the first optical sensor section 31 fails to detect the rotational speed and the rotational direction of the operation discal unit 28, due to adhesion of dusts. Accordingly, it is further possible to avoid an operation failure (inaccurate reproduction operation and the like) based on an erroneous detection, thereby achieving an enhancement of reliability.

In the present embodiment as described above, a CD player for reproducing audio data recorded on a CD has been explained as an example. However, the present invention can be applied to any type of apparatus which performs a reproduction of data recorded on an optical disc. For example, it can be applied to an apparatus which reproduces image data recorded on a DVD (Digital Versatile Disc). In this case, the image data normally reproduced or specially reproduced may be outputted to a display, a projector for home theater use and the like.

Figure 3:
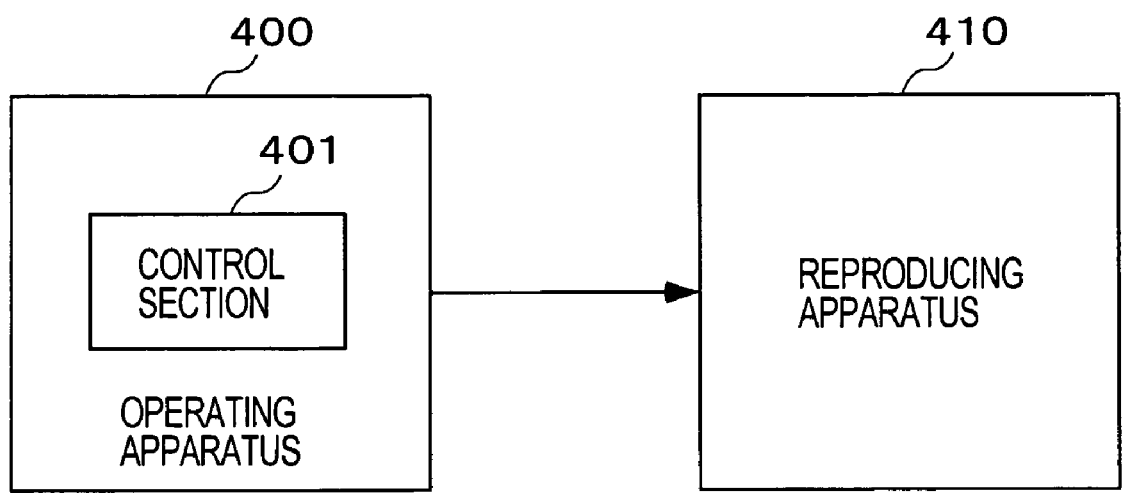
FIG. 3 is a diagram showing a modified example of an embodiment of the present invention.

Furthermore, in the present embodiment as described above, a configuration in which the operating section 14 and the reading section such as the optical pickup 4 are integrated has been explained. However, the present invention is not limited to this, and the operating section and the reading section may be configured separately. For example, as shown in FIG. 3, it is possible to operate a reproducing apparatus 410 (normal operation or special operation), via an operating apparatus 400 connected thereto, which has a configuration similar to the operating section 14. In this case, for example, when the control section 401 of the operating apparatus 400 detects a special operation by a user, the control section 401 forwards to the reproducing apparatus 410 a control signal for the special reproducing operation as described above. Accordingly, it is possible for the user to allow the reproducing apparatus 410 to perform a desired data reproduction, via the operating apparatus 400.

While the preferred embodiments of the present invention have been illustrated in detail, it should be apparent that modifications and adaptations to those embodiments may occur to one skilled in the art without departing from the scope of the present invention as set forth in the following claims.

The disclosure of Japanese Patent Application No. JP 2003-340234 filed on Sep. 30, 2003, including the specification, drawings and abstract is incorporated herein by reference in its entirety.

What is claimed is:

1. An optical disc reproducing apparatus comprising,
a housing;
a reading section for reading data recorded on an optical disc;

a storing section which stores data read by said reading section;

a reproducing section which can reproduce data stored in said storing section;

a reference discal unit which is disposed outside said housing and which is rotatable at a predetermined reference rotational speed and in a predetermined reference rotational direction;

an operation discal unit which is mounted on said reference discal unit to rotate together with said reference discal unit, and which is capable of rotating in a desired rotational direction at a desired rotational speed according to a user's manipulation;

a detection discal unit which is accommodated in said housing, and which is connected with said operation discal unit to rotate in sync with the rotation of said operation discal unit;

a first detecting section which is disposed inside said housing, and which can detect a rotational speed and rotational direction of said detection discal unit;

a second detecting section which is disposed outside said housing, and which can detect a rotational speed and rotational direction of said reference discal unit; and a control section which can determine the rotational speed and rotational direction of said detection discal unit based on each detected result from said first detecting section and said second detecting section, and which can control said reading section, said storing section and said reproducing section, so that a data reproduction desired by the user can be performed, wherein said reading section is disposed in said housing.

wherein said reference discal unit is rotatably mounted on a cylindrical member fixed to said housing. and wherein said operation discal unit is connected to said detection discal unit by a shaft at least partly located inside said fixed cylindrical member.

2. An optical disc reproducing apparatus according to claim 1, wherein, said control section gives a control to read the data stored in said storing section at a predetermined reference reading speed and in a predetermined reference reading sequence, when it is determined that said detection discal unit is rotating at said reference rotational speed and in said reference rotational direction; and said control section gives a control to read the data stored in said storing section at the reading speed and in the reading sequence according to a detected result from said first detecting section, when it is determined that said detection discal unit is not rotating at said reference rotational speed in said reference rotational direction.

3. An optical disc reproducing apparatus according to claim 1, wherein, the reference discal unit has a cross-section of concave shape, and with the concave shaped portion of said reference discal unit, said second detecting section is protected from outside.

* * * * *